A. G. Coes,

Wrench.

No. 874. Reissued Jan. 3, 1860.

Witnesses:
Thos. R. Upperman
J. Koch

Inventor:
Amy G. Coes.
per A. B. Longstreet atty.

UNITED STATES PATENT OFFICE.

AURY G. COES, OF WORCESTER, MASSACHUSETTS.

IMPROVED SCREW-WRENCH.

Specification forming part of Letters Patent No. 9,945, dated August 16, 1853; Reissue No. 874, dated January 3, 1860.

*To all whom it may concern:*

Be it known that I, AURY G. COES, of Worcester, in the county of Worcester and State of Massachusetts, have invented a new and useful Improvement in Screw-Wrenches; and I do hereby declare the following to be a full, clear, and exact description of the construction and operation of the same, reference being had to the accompanying drawings, making a part of this specification, in which—

Figure 1:
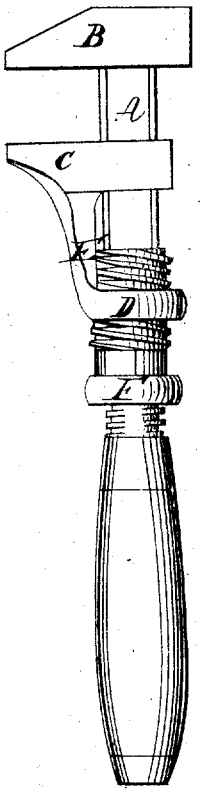
Figure 2:
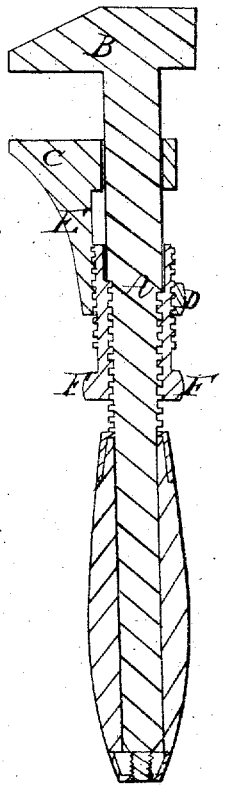
Figure 3:
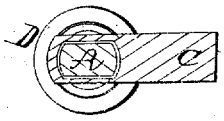

Figure 1 represents a side view of my wrench. Fig. 2 represents a central longitudinal section thereof, and Fig. 3 represents a transverse section through the sliding jaw and the shank of the wrench.

Similar letters of reference where they occur in the several figures denote like parts of the wrench in all of them.

My invention consists in operating the sliding jaw of a wrench by means of two screws, so that said jaw shall move at a velocity equal to the united speed of said two screws.

A represents the shank of the wrench, to which the hammer or stationary jaw B is attached. C is the movable jaw. It is connected to a nut or annulus, D, by means of an arm, E. F is a burr or nut for working the movable jaw C on the shank A. This burr F has upon it two screw-threads, which incline in opposite directions, one of which moves the sliding jaw on the shank, and the other screw moves the burr itself, so that the jaw C moves with the united velocities of both screws. The advantages of this rapid movement of the sliding jaw on the shank is obvious, as the wrench can be more readily adaptable to varied articles to be gripped by it.

It will be perceived that the burr or nut F travels endwise on the shank A, and that the two screws which work the jaw along on the shank are inclined in opposite directions. These two features are necessary to the action of the wrench; but the shape, size, and location of the devices for connecting the movable jaw to the shank may be varied without departing from the characteristic and leading features of my invention—viz., the use of two screws for moving the sliding jaw of a wrench so that said jaw shall travel with the united speed of said two screws.

I have shown one mode of applying the two screws to the working of the movable jaw of a wrench, but I do not confine myself to this exact construction, claiming that I am the first to give this accelerated or compound motion to a sliding jaw by the application of the speed of two screws to it. These two screws are operated by simply turning the burr F, which travels also on the shank, by the action of one of them, and the other screw acts more immediately on the movable jaw, their compound action effecting the purpose hereinbefore mentioned, and the screws being a right and left hand one or a right and left hand thread, whether it be called two screws or one screw, so long as they effect the purpose herein set forth as the characteristic of this invention.

Having thus fully described the nature and object of my invention, what I claim therein as new, and desire to secure by Letters Patent, is—

The use of two screws in working the movable jaw of a wrench, so that said jaw will travel with the united velocities of said two screws, substantially as set forth.

AURY G. COES.

Witnesses:
CHAS. DEVENS, Jr.,
G. F. HOAR.